Patented Apr. 8, 1930

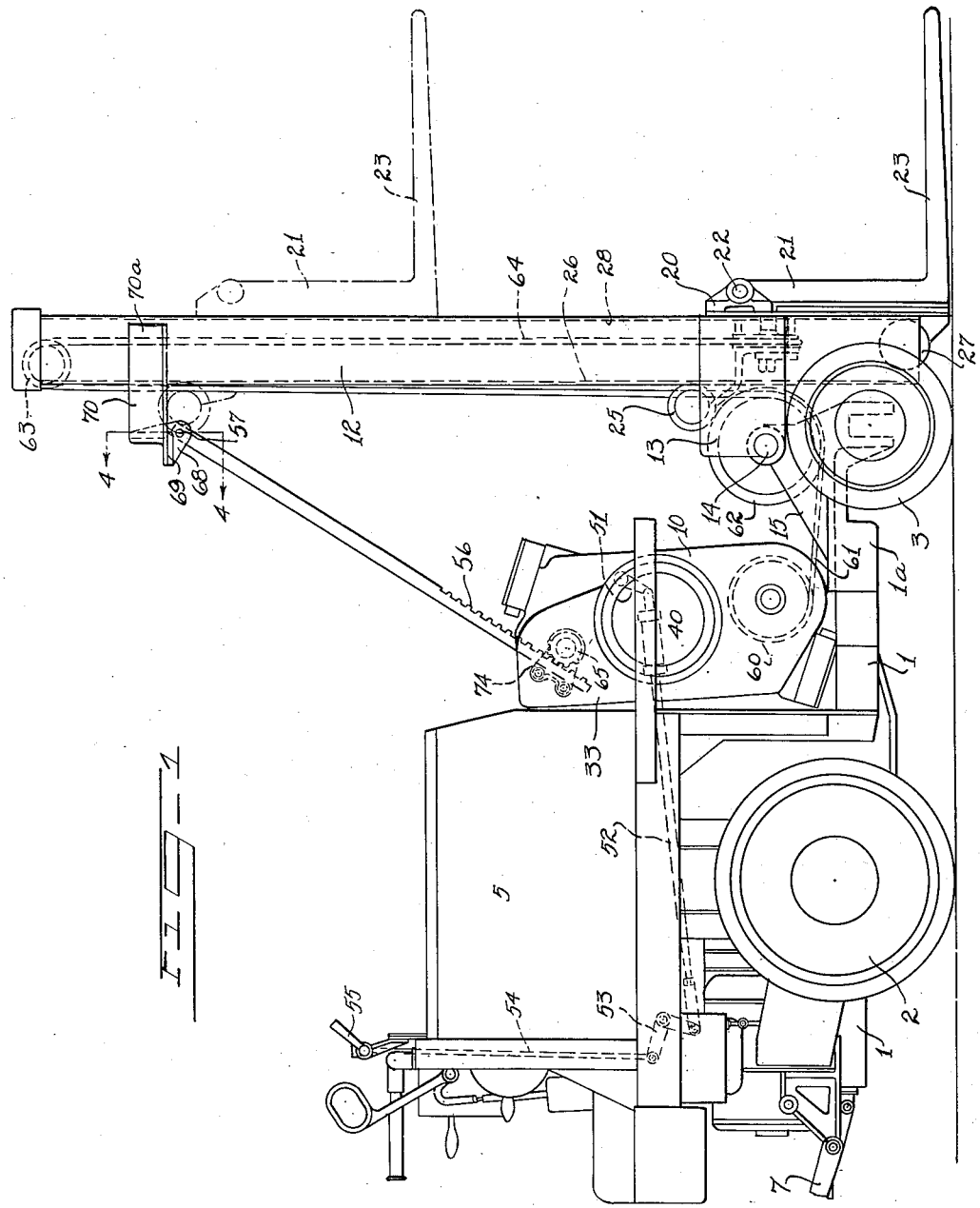

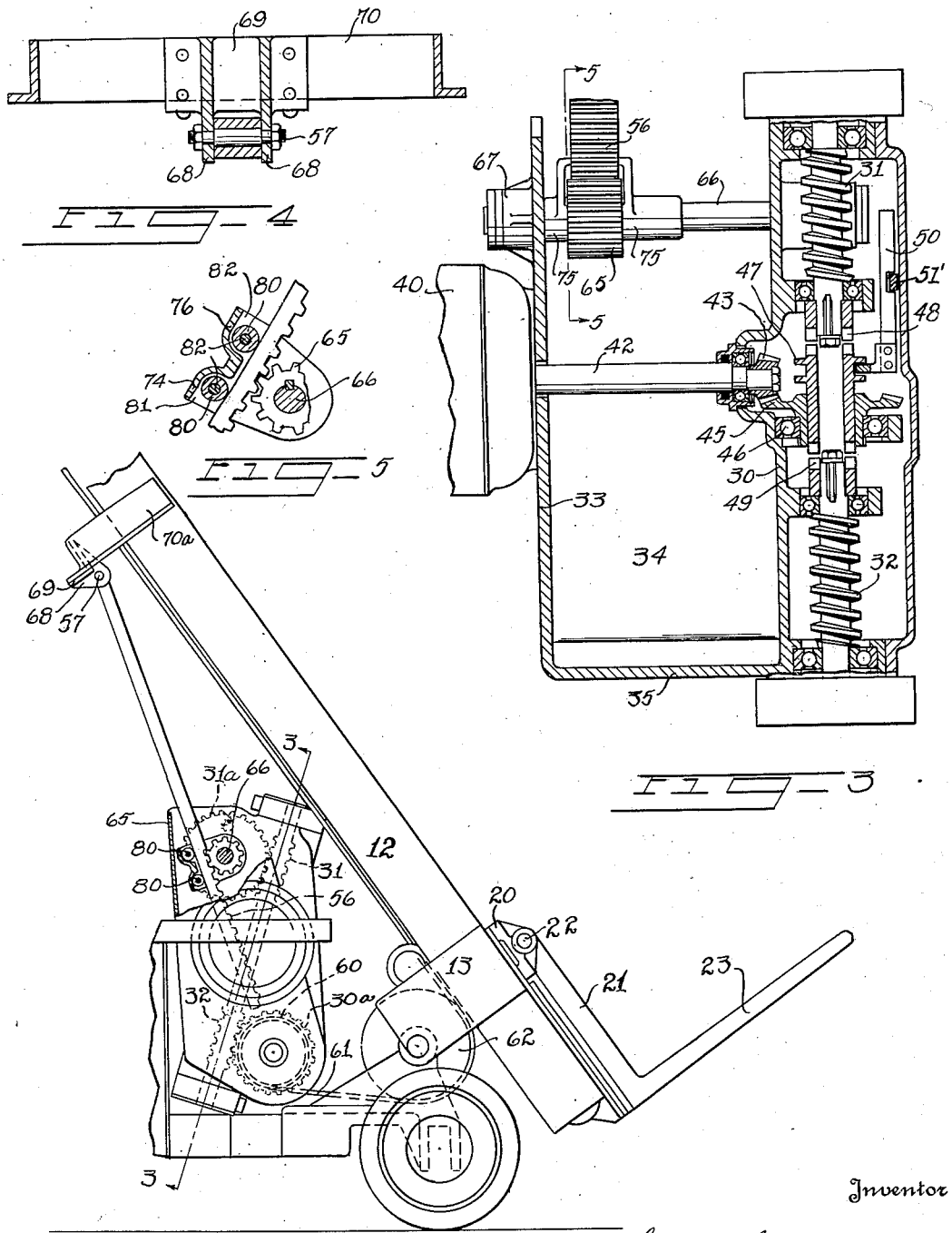

1,753,731

UNITED STATES PATENT OFFICE

EDWARD J. ABBE, OF CLEVELAND, OHIO, ASSIGNOR TO THE ELWELL PARKER ELECTRIC COMPANY, OF CLEVELAND, OHIO, A CORPORATION OF OHIO

INDUSTRIAL TRUCK

Application filed February 16, 1927. Serial No. 168,544.

This invention relates to industrial trucks, particularly to the raisable platform or tier lift type such as are used for engaging a load and raising it to various heights as for purposes of receiving a load at one level, transporting it and discharging it at another level. An object is to provide a simple effective load positioning mechanism in connection with an industrial truck.

A further object of the invention is to provide a truck having a tiltable frame or trackway for guiding a tier-lift platform or the like, with mechanism for positively moving or tilting such trackway in two directions.

In the use of trucks of this character it has been the practice to move such a trackway in one direction by the use of a cable against the action of a spring or the like, the spring afterwards serving to return the trackway to its initial position as the cable is fed out. One disadvantage of such construction is that the cable or cables sometimes break and the suddenly released spring is likely to cause considerable damage. Another disadvantage is that the frame cannot be used to shove against a body such as a heavily loaded container to tilt it if such body is sufficiently heavy to overcome the force of the spring. My mechanism acts positively on the frame to tilt it in either direction wherefore the use of a truck equipped with my mechanism is not accompanied by the disadvantages mentioned.

The mechanism has other advantages as will be seen from the following description relating to the accompanying drawings wherein I have shown my preferred form.

In the drawings Fig. 1 is a side elevation of a truck with my invention incorporated therewith. Fig. 2 is a fragmentary side elevation of the front or load engaging portion of the truck showing the frame or trackway in tilted position, a portion of the frame tilting mechanism being shown in cross section. Fig 3 is a cross sectional view through a convenient hoisting mechanism as indicated by the line 3—3 on Fig. 2. Fig. 4 is a fragmentary detailed sectional view as indicated by the line 4—4 on Fig. 1. Fig. 5 is a sectional detail as indicated by the line 5—5 on Fig. 3.

Referring in detail to the drawings 1 indicates the frame of an industrial truck of a known type having rear traction wheels 2 suitably driven by a motor (not shown) and a pair of dirigible front wheels suitably controlled from the rear of the truck at the operator's position by linkage and levers (not shown). A similar truck may be found in the prior patent to Clyde E. Cochran No. 1,538,168 issued May 19, 1925.

The power for such a truck may comprise electric batteries located in an upright battery housing, 5 surmounting the rear end of the truck and positioned substantially over the driving wheels. A pivoted operator's platform is indicated at 7 on which the operator stands and which may be suitably connected to truck control elements such as the main control switch. The operator standing on this platform is in reach of control levers such as for example the steering gear Intermediately of the two sets of wheels is shown a hoisting unit 10 resting on a portion 1ª of the frame which connects the rear portion to the front wheel supports. This hoisting unit, as shown, is arranged to raise and lower a load engaging platform on a tiltable trackway and also to tilt the trackway.

The trackway comprises as shown, an upright frame member 12 which may be built up from structural members in such manner as to be very rigid, the trackway having a rearward extension 13 at its lower end, pivoted as at 14, to upwardly extending brackets 15 supported on the main frame 1, one bracket being shown in Fig. 1. The platform may comprise a carriage having a frame 20 and an L shaped load engaging member 21 shown as suspended from a pivot 22 on the carriage frame and having a forward extension 23 for engaging beneath the load. This load engaging member may, of course, be differently formed and adapted for different loads. The carriage has rollers or wheels, one being shown at 25, adapted to engage structural flanges forming part of the frame 12, one of such flanges being indicated by a dotted line at 26. Other rollers 27 (one being shown) engage similar flanges 28 of the upright frame structure.

The means for raising and lowering the platform and tilting the trackway may be operated from a single motor, by mechanism such as shown in Fig. 3. Similar mechanism is shown and claimed in my co-pending application, Serial Number 615,203 filed January 27, 1923. The essential parts of such hoisting mechanism are shown in Figs. 2 and 3. The frame for the housing comprises suitable castings, one section consisting of a tubular portion 30 for housing a pair of worm shafts 31 and 32 and selective driving gearing hereinafter mentioned, this section being provided with a motor support portion 33 connected to the tubular portion as by wall members 34 and 35. The motor is indicated at 40, having a shaft 42 extending through the wall 33 and to within the tubular portion 30 and having a bevel pinion 43 thereon.

The pinion as shown meshes with teeth of a bevel gear 45 supported in a rigid bearing 46 and suitably maintained against longitudinal movement. There is a sleeve 47 drivingly rigid with the gear but capable of being moved longitudinally relative thereto as by reason of a splined connection (not shown). The sleeve is equipped with dental clutch teeth at its ends for engagement with clutch members 48 and 49 on the shafts 31 and 32 respectively. Suitable means for controlling the position of the clutch sleeve from the operator's position on the truck may comprise a sliding bar 50 having the usual fork connection with the sleeve, the bar being moved by a portion of a lever 51 which extends within the casing as at 51' (see Fig. 3). The lever 51 is in turn connected as by a link 52 with a bell crank 53 near the control end of the truck. The bell crank 53 has one arm thereof connected as by a link 54 to an operating handle 55 surmounting the truck frame. Manipulation of the lever may be thus caused to shift the bar to cause the motor to drive a selected worm shaft. The worms mesh with worm gears 30$^a$ and 31$^a$, the former having connections to raise and lower the platform, the latter having connections to tilt the trackway.

The connections for raising and lowering the load comprise a drum 60 rigid with the worm gear 30$^a$ having a cable 61 passing under a sheave 62 then upwardly to a sheave 63 at the top of a frame and then downwardly as at 64 to engage the carriage.

The mechanism for operating the trackway affording frame or boom 12 to tilt it, forms the nucleus of the present invention. This mechanism comprises, as shown, a pinion 65 rigid with a shaft 66 having a bearing at one end as at 67 supported by the wall portion 33 of the hoisting mechanism housing and having, of course, suitable bearings at the other end (not shown). The worm gear 31$^a$ is drivingly rigid with this shaft 66 and it follows that, when the clutch sleeve 47 is in position to engage the clutch 48, the pinion is driven in one direction or the other, depending on the direction of rotation of the motor. The usual reversing arrangement for the motor may be provided so that the pinion may be driven in either direction as desired by the operator. The pinion 65 meshes with teeth 56 on a rigid rack bar pivotally connected at 57 between a pair of ears 68 on a bracket 69 secured to a transverse member 70 shown as L shaped in cross section and in spaced apart relation to the frame 12 at its central portion and secured thereto at its ends as at 70$^a$.

For holding the rack teeth in engagement with the pinion while allowing the rack to swing about the pinion axis, I have shown a yoke member 74 having bearing portions 75 embracing the shaft 66 loosely at either side of the pinion and looping around the side of the rack opposite the pinion teeth as at 76. This member 74 is preferably provided with antifriction means such as rollers to prevent any binding action between it and the rack. As shown, a pair of rollers 80 are contained in respective recesses 81 in the member 74 and held in place by suitable pins 82 positioned in the walls of the member 74 at each side of the respective recesses. The truck with my invention incorporated therewith, operates as follows:—

The operator drives the truck up to the load and causes the extension 23 of the load engaging members to engage beneath the load and then, through suitable controls such as mentioned, he may throw into action the shaft 32 through the clutch 47—49 and start the motor to raise the load to the required height, after which for the purpose of better carrying of the load he may tilt the boom by reversing the position of the clutch 47 so that the pinion 65 drives the rack to pull inwardly and downwardly on the upper end of the platform trackway as far as desired. Suitable means such for example as shown in my copending application Serial No. 166,087 filed February 5, 1927, may be used to limit both the upward movement of the platform and the tilting movement of the boom in such manner as to throw off the motor when the platform has been raised to a predetermined position or when the boom has been tilted to a given position.

With my arrangement, should the tilting mechanism become damaged, as by a broken part or a sheared pin, the worst that can happen will be that the load will return the boom to upright position, but it will not be thrown forwardly with a jerk, catapulting the load as was formerly the case where springs were used to return the boom to upright position.

A further advantage which will be seen from my construction is perhaps best illustrated by reference to handling large paper rolls. The usual chisel wedge may for the moment be considered as mounted in place of the platform herein shown. To load such roll, the boom may be trust forward beyond its upright position about the pivot 14 and the upper end of the boom caused to engage the upper end of the paper roll to tilt it before the chisel wedge has reached the lower adjacent edge of the roll. This will permit the wedge to pass under the roll without damaging the paper, and after it is completely under, the boom may be uprighted by manipulation of the hoist controls and the boom swung back to seat the roll in suitable cradle like carriers (not shown), but which are well known in this art and which may be carried rigidly on the frame.

I claim:—

1. In combination with an industrial truck, an upright trackway pivotally mounted on the truck, load engaging means guided by the trackway, power hoisting mechanism with connections to both tilt the trackway and raise and lower the load engaging means, the tilting connection including a rigid oscillatable and reciprocable member pivotally attached to the trackway, there being means movably engaging the member to hold it in cooperative relation to the hoisting mechanism.

2. In combination with an industrial truck, tiltable load sustaining means carried on the truck, load engaging means mounted to traverse the said first named means, power hoisting mechanism mounted on the truck comprising a motor, reduction gearing and a driven element, a pinion connected to said element and a substantially straight rack pivotally attached at one end to the tiltable means and having rack teeth engaging the pinion, there being means pivotally mounted on said driven element and guidingly engaging the rack to hold the same in engagement with the pinion.

3. In an industrial traction driven truck, a frame, an operator's control platform mounted at one end of the frame, a pivoted upright trackway at the other, a carriage mounted to move up and down on the trackway and having means to engage and sustain a load, a power hoist mounted on the frame between the trackway and operator's platform, said hoist comprising a motor, two power delivery shafts and selective means to cause one or the other shaft to be driven by the motor, and a cable connection between one shaft and the carriage and a rack and pinion connection between the other shaft and the trackway to tilt it, the rack of said latter connection being pivotally attached to the trackway.

4. In an industrial truck a load sustaining member pivotally mounted on a truck, power mechanism including a motor and a driving shaft and pinion, the latter being axially parallel to the pivot of said member, a rack bar pivotally attached to the said member and having teeth in mesh with the pinion, a member supported by the pinion shaft at each side of the pinion and extending around the rack bar opposite the point of engagement of the rack and pinion teeth, and a roller carried by said member positioned to maintain such engagement.

5. In an industrial truck a load sustaining member pivotally mounted on the truck, power mechanism including a motor and a driving shaft having a pinion axially parallel to the pivot of said member, a rack bar pivotally attached to the said member and having teeth in mesh with the pinion, means embracing the rack bar and swingably mounted on the pinion shaft, and anti-friction means carried by the first named means and engaging the rack bar on the side thereof opposite the shaft for holding the rack and pinion teeth in engagement while permitting the free movement of the bar.

6. In a truck a pivotally mounted upright frame, load engaging means mounted to traverse the frame, hoisting mechanism including a motor, a gearing and a pair of driven shafts one being connected to said load engaging means to cause such traversing movement, and the other being connected to said frame to tilt it about its pivot, the last mentioned connection comprising a rigid rack bar pivotally attached to the frame, a pinion on said other shaft, and a strap member embracing the last mentioned shaft at each side of the pinion, there being rollers carried by the strap member disposed in separated relation longitudinally of the bar in planes at each side of the pinion axis and bearing against the bar to maintain the rack and pinion teeth in engagement while permitting the free movement of the bar.

7. In an industrial truck a main frame and driving mechanism including traction wheels mounted at the rear of the frame, dirigible wheels mounted at the front end of the frame, a housing mounted intermediately of the ends of the frame, a pair of worm shafts mounted in the housing, a motor rigid with the housing and having selective connections for driving the worm shafts, parallel shafts equipped with worm gears engaging the worm shafts, a drum on one of the shafts and a pinion on the other, a pivoted upright frame carried by the main truck frame forwardly of the housing, load engaging means mounted to move up and down on the pivoted frame, a cable connected with the drum and arranged to raise and lower the load engaging means, and a rigid rack bar pivotally attached to the upper end of the pivoted frame and having teeth engaging said pinion for tilting said pivoted frame.

In testimony whereof, I hereunto affix my signature.

EDWARD J. ABBE.